G. B. DOWDEN.
VEHICLE TOP.
APPLICATION FILED SEPT. 19, 1916.

1,247,243.

Patented Nov. 20, 1917.

WITNESSES
Arthur K. Moore
H. P. Hollingsworth

INVENTOR
George B. Dowden
By Richard B. Owen,
ATTORNEY

UNITED STATES PATENT OFFICE.

GEORGE B. DOWDEN, OF DETROIT, MICHIGAN.

VEHICLE-TOP.

1,247,243.   Specification of Letters Patent.   Patented Nov. 20, 1917.

Application filed September 19, 1916. Serial No. 121,044.

*To all whom it may concern:*

Be it known that I, GEORGE B. DOWDEN, a citizen of the United States, residing at Detroit, in the county of Wayne and State of Michigan, have invented certain new and useful Improvements in Vehicle-Tops, of which the following is a specification.

This invention relates to tops for automobiles and other vehicles and has for its principal object to provide a framework for such tops which will be self-supporting and which will be attached at one point only on each side of the vehicle to the upper edge thereof.

Another object of the invention is to provide a frame for a vehicle top which can be folded into compact form at the rear of the vehicle and which may be readily opened out and extended into service use by one person alone.

A further object of the invention is to provide a vehicle top made of few parts of light material and so connected as to be strongly braced when opened out for use and which will be disposed in compact form when folded.

With these objects in view, the invention consists of the construction, combination and arrangement of parts hereinafter described, pointed out in the claims and illustrated in the accompanying drawings in which:

Figure 1:
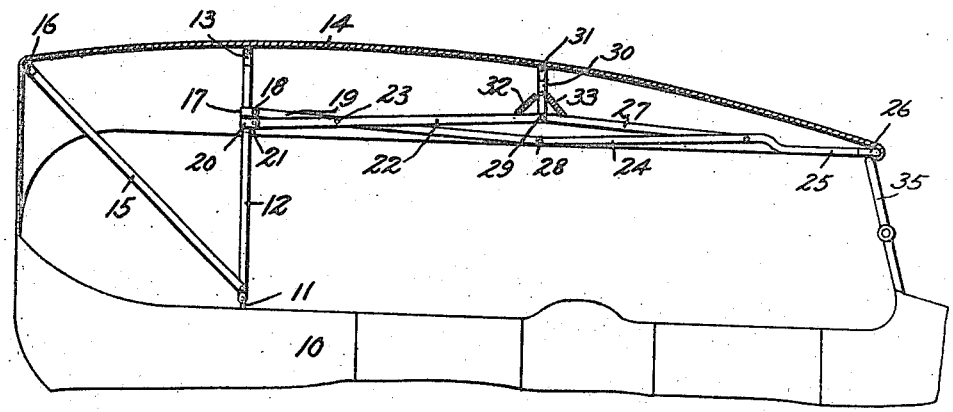
Figure 1 is a side elevation of the top frame extended in position for use on an automobile.

In the drawings, 10 indicates an automobile body on each side of which near the rear thereof is fastened an upstanding bracket 11 to each of which brackets is pivoted a straight socket 12 that, in open position of the top stands vertically. In the upper ends of the sockets 12 are seated and secured the ends of a bow 13 that extends across the vehicle from side to side, and serves to support and maintain in stretched position, the cover 14 of the top.

Pivoted near the lower ends of each socket 12 is a rearwardly inclined socket 15, the upper ends of which sockets support the ends of the rear bow 16 over which the cover 14 is folded and extends in the form of a curtain downwardly to the body of the vehicle.

Fastened rigidly to each socket 12, a short distance below the upper end thereof, is a collar 17 having ears 18 on the front side to which is pivoted a flat metal bar 19 that extends forwardly at a slight inclination downwardly from the horizontal, when the top is extended. Slidable longitudinally on each socket 12, below the collar 17, is a sleeve 20, to ears 21 on the front of which is pivoted a flat bar 22 that extends forwardly at a slight upward inclination and crosses the bar 19 at a point adjacent the center of the length thereof, the two bars being connected by a pivot bolt 23. The bars 19 and 22 are of equal length and extend, when the top is in open position, about half the distance from the sockets 12 to the front end of the top.

Pivoted on the forward end of each bar 19 is a bar 24, each bar terminating near the forward end of the top, in a socket 25 into the ends of which sockets are inserted and fastened the ends of the front bow 26. Pivoted to the forward end of each bar 22 is a brace bar 27 that extends downwardly and is pivotedly connected at its forward end to the bar 24 about midway between the bow 26 and its pivotal connection 28 with the bar 19.

Journaled on the bolt 29 that pivotally connects the ends of the bars 22 and 27, is a short socket 30, there being one of these sockets on each side of the top, into the open upper ends of which are seated the ends of an intermediate bow 31. To maintain the sockets 30 and the bow connecting them in vertical position when the top is opened, and at all other times at equal angular distances from the bars 22 and 27, I provide two spiral or coil springs 32 and 33 on each side of the top, those of one side being connected each at one end to a pin 34 projecting from the side of the socket 30 and their lower ends each connected to a pin in the respective bars 22 and 27. The springs 32 and 33 have the same tension and extend downwardly at an angle to the bars aforesaid so that when the top is extended, these springs form resilient braces for the sockets 30 and hold them in their upstanding vertical positions.

Figure 2:
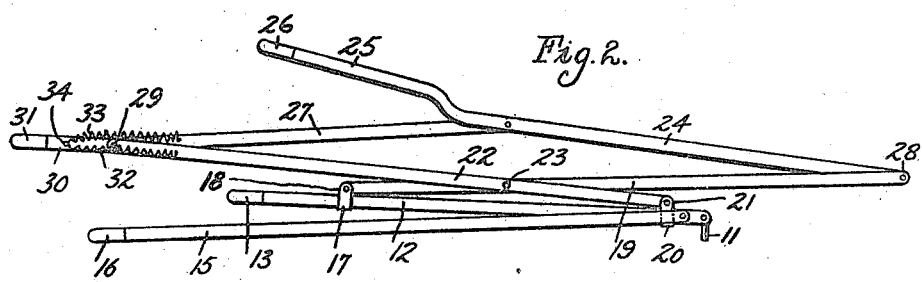
Fig. 2 is a similar view of the frame enlarged, and in folded position.
Figure 3:
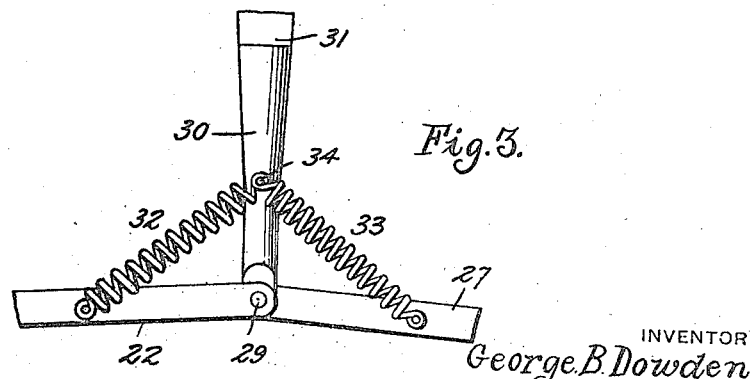
Fig. 3 is a still larger view of a detail of the invention.

It will be observed that the bars 19, 22, 24 and 27 form elements of a lazy tongs structure which when in one position, as in Fig. 1, causes a projection forwardly of the free ends with the bow 26 to a relatively great distance from the opposite or fixed ends at the sockets 12 while the opposite position of these parts, which results from a downward movement of the sleeves 20 on the sockets 12, causes the various bars mentioned to fold together closely as in Fig. 2, and the several bows 13, 31 and 26 into close proximity between which the cover 14 will fold in a manner common to carriage tops.

After the parts in front of the sockets 12 have been folded in the manner just described, the sockets themselves are pushed rearwardly on their brackets 11, approaching by this movement the rearwardly inclined sockets 15 which because of their pivotal connection with the sockets 12, also swing rearwardly and downwardly until all of the parts of the top frame are brought into close relation to each other as in Fig. 2. In this folding operation, the bars 22 and 27, because of their pivotal connection at 29, are brought close together, the socket 30 however remains at the same relative angular distance from each because of the equal tension of the springs 32 and 33 on opposite sides thereof. This is of great advantage as it holds the sockets with their connecting bow 21 in proper position to support the cover and prevent said parts from swinging out of place when the top is folded and require attention at the time it is to be opened out.

To open the top from a closed position, it is only necessary to swing the sockets 12 upwardly into vertical position and then slide or push the sleeves 20 upwardly on the sockets and when they have reached their uppermost position near the collar 17, secure the sleeves in place. This upward movement of the sleeves will straighten out the several pivotally connected bars and force the front bow 26 forward into position above the wind shield 35 of the automobile.

What I claim is:

1. A vehicle comprising a pair of sockets connected by a bow pivoted at its ends to the sides of a vehicle, a rearwardly extending arched member pivoted to said sockets, foldable levers on each side of the top comprising a plurality of bars pivoted together, one of said bars being pivotally connected to each of said sockets and another pivoted to a connection slidable on said socket, an arched member fixed to said levers and adapted to be projected forwardly over the vehicle, a socket on each side of the top pivoted to the pivotal connection between two of said bars, and spring means for maintaining said pivoted sockets at equal relative angles to said bars.

2. In a vehicle top, an arched member pivotally connected at its ends to opposite sides of the vehicle body, a second arched member pivoted to the first near its lower end and extending rearwardly therefrom, a straight bar pivoted to said first arched member on each side of the top, a sleeve slidable on each side of the said first arched member, a second straight bar pivoted on each sleeve and between its ends to an adjacent first-named straight bar, a front arched member pivoted at its ends to the front ends of said first-named straight bar, a brace pivoted to the front end of each second-named straight bar and to the front arched member, an intermediate arched member carried by the pivots joining the second-named bars and the braces, and oppositely disposed resilient braces connected to said intermediate arched member on each side and to the adjacent straight bars.

In testimony whereof I affix my signature in presence of two witnesses.

GEORGE B. DOWDEN.

Witnesses:
G. E. FORNSHELL,
Mrs. G. E. FORNSHELL.

Copies of this patent may be obtained for five cents each, by addressing the "Commissioner of Patents, Washington, D. C."